T. J. POLK.
COMBINED KITCHEN CABINET AND REFRIGERATOR.
APPLICATION FILED APR. 7, 1916. RENEWED JULY 15, 1918.
1,296,005.
Patented Mar. 4, 1919.
3 SHEETS—SHEET 1.
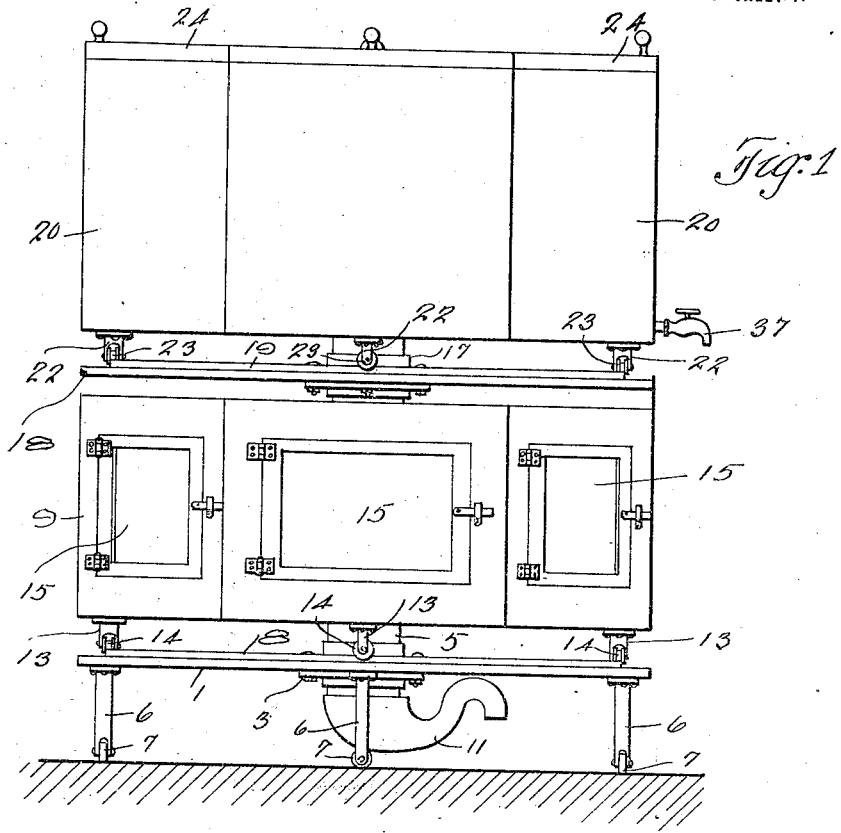
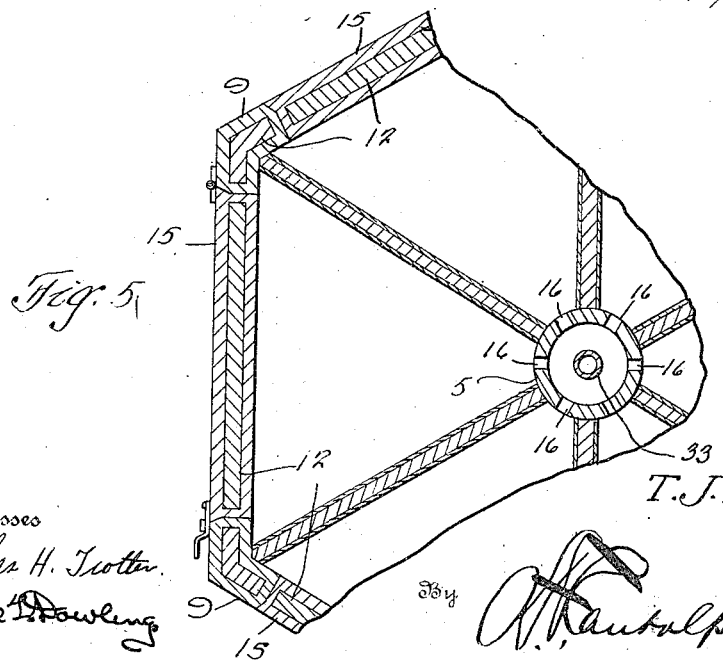

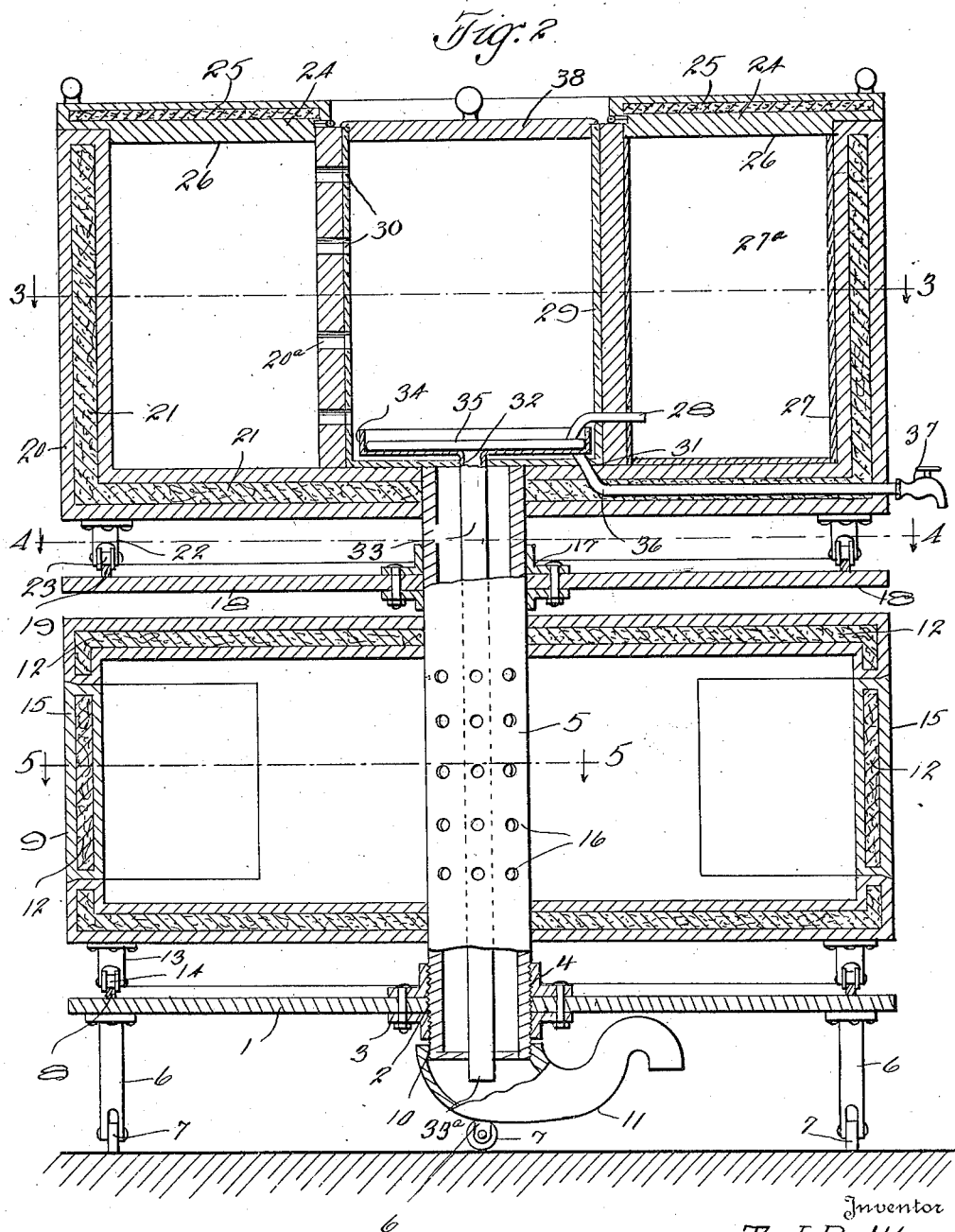

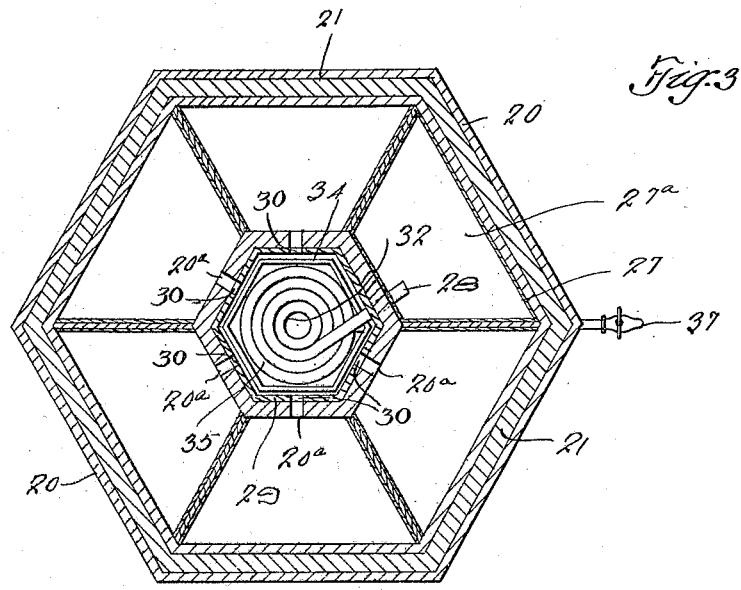
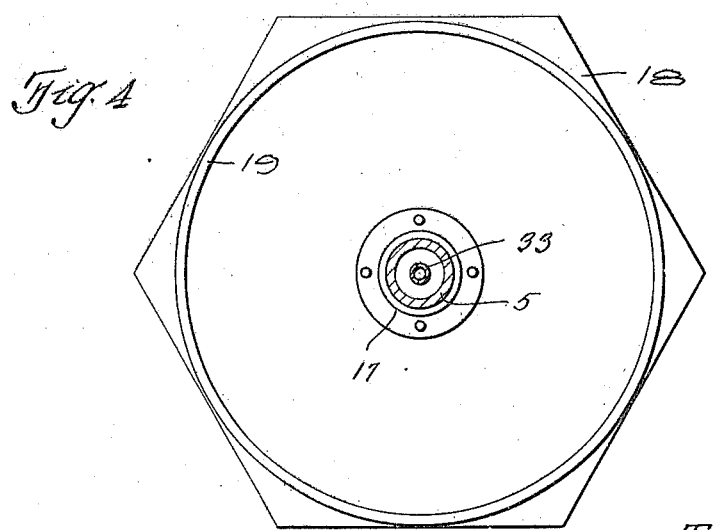

UNITED STATES PATENT OFFICE.

THOMAS J. POLK, OF BEAUMONT, TEXAS.

COMBINED KITCHEN-CABINET AND REFRIGERATOR.

1,296,005.        Specification of Letters Patent.        Patented Mar. 4, 1919.

Application filed April 7, 1916, Serial No. 89,639. Renewed July 15, 1918. Serial No. 245,074.

*To all whom it may concern:*

Be it known that I, THOMAS J. POLK, a citizen of the United States, residing at Beaumont, in the county of Jefferson and State of Texas, have invented certain new and useful Improvements in Combined Kitchen-Cabinets and Refrigerators; and I do hereby declare the following to be a full, clear, and exact description of the invention, such as will enable others skilled in the art to which it appertains to make and use the same.

This invention relates to improvements in combined kitchen cabinets and refrigerators.

The object of the present invention is to improve the construction of kitchen cabinets and refrigerators, and to provide a simple, practical, and comparatively inexpensive structure of this character, which combines the refrigerator and kitchen cabinet for the retaining of various foodstuffs and other articles used in the kitchen, and a single and compact piece of furniture, whereby a greater amount of retaining space is provided by taking up a small amount of kitchen space.

Another object of the invention is the provision of a base in which is a hollow standard, which standard supports the revolving sections thereabout, the lowermost of which sections is constructed for forming a kitchen cabinet, while the upper section is constructed for forming a refrigerator and ice chest, whereby the various compartments may be maintained at a cool temperature at all times.

With these and other objects in view the invention consists in the construction and novel combination and arrangement of parts hereinafter fully described, and illustrated in the accompanying drawings, and pointed out in the claims hereto appended.

In the drawings:—

Figure 1 is a side elevation of the improved kitchen cabinet and refrigerator made in accordance with this invention, Fig. 2 is a vertical cross sectional view of the same, and Fig. 3 is a horizontal sectional view on the line 3—3 of Fig. 2, and Fig. 4 is a horizontal sectional view taken on the line 4—4 of Fig. 2, and Fig. 5 is a horizontal sectional view taken on the line 5—5 of Fig. 2 with parts broken away and part in section.

Referring more particularly to the drawings, 1 indicates the base having a central opening 2 in which is secured a supporting sleeve 3, the interior of the sleeve being screw threaded as at 4 to removably support a hollow standard 5. Secured to the under side of the base 1 near its outer edge are supporting legs 6 in the lower ends of which are journaled rollers 7, to facilitate the moving of the base over a floor. An annular circumferential track 8 is secured to the upper face of the base 1, and is located directly above the supporting legs 6 rotatably supporting a compartment 9 thereon.

The hollow standard 5, as heretofore mentioned, has its lower end screw threaded as at 10, to screw threadedly receive the threads of the sleeve 3, the lower end of the standard projecting below the lower edge of the sleeve to screw threadedly receive a goose-neck water trap 11 thereon.

The compartment 9 is arranged around the standard 1 and is constructed for forming a kitchen cabinet having its walls of double thickness and packed with suitable insulating material as is shown at 12. The cabinet 9 is polygonal in shape having any desired number of sides and rotatably mounted around the standard 5, secured to the under side of the bottom wall of the cabinet 9 is a plurality of legs 13 which are located over the track 8 of the base 1. The legs 13 have grooved wheels 14 in their lower ends engaging the track 8 for rotatably supporting the cabinet 9 upon the base 1, and around the standard 5.

The compartment 9 has doors 15 hingedly connected to their respective straight sides to permit access into the interior of the various compartments.

The standard 5 is also provided with a plurality of circumferentially and longitudinally spaced openings 16, which openings are located in the standard 5 between the top and bottom walls of the cabinet 9 to permit of the efficient circulation of the air within the various compartments of the cabinet.

A second supporting sleeve 17 is arranged around the standard 5 adjacent its upper end at a relative spaced distance from the top wall of the compartment 9. Secured in the sleeve 17 is a supporting platform 18 on the upper face of which is an annular circumferentially extending track 19, upon which is rotatably mounted the refrigerator 20, which refrigerator is provided with a plurality of compartments of less diameter than the compartments of the cabinet 9. The bottom, top, front and partition walls of the refrigerator 20 are of double thickness and are packed with a suitable insulating material 21.

Carried by the under side of the bottom of the refrigerator 20, are supporting legs 22 in the lower ends of which are journaled grooved wheels 23, to receive the track 19 for rotatably supporting the refrigerator 20 as heretofore stated. The bottom wall of the refrigerator is rotatably arranged around the upper end of the standard 5, and its rear walls are provided with a plurality of spaced openings 20ª, and hingedly secured to the upper edges of the rear wall of the compartments are the covers 24, which covers are provided with the double wall for receiving a suitable packing or insulating material 25 therein, the under side of said covers are provided with downwardly depending portions 26 which extend in the various compartments of the refrigerator for forming air tight connection with the upper edges of the same. One of the refrigerating compartments being lined with suitable metal 27 forming a water compartment 27ª in which extends a pipe 28, the inner end of the pipe 28 extending into a metal ice chamber 29 which is located centrally in the refrigerator. The walls of the metal ice chamber 29 are provided with a plurality of spaced openings 30 alining with the openings in the rear walls of the refrigerator compartments to permit efficient current of air to pass through the various refrigerating compartments.

The bottom wall 31 of the ice chamber 29 is provided with central opening 32, through which projects the upper end of the drain pipe 33, the lower end of the pipe extending downwardly into the hollow standard 5 and terminating at its lower end beyond the lower end of the standard 5 as at 33ª. Carried by the upper end of the drain pipe 33 is a drain pan 34, which is rigidly secured to the upper end of the drain pipe 33, thereby establishing communication therewith, and resting upon the upper face of the drain pan 34 is a coil 35, one end of which is connected to the inner end of the water pipe 28, and its opposite end extending downwardly through the bottom wall of the ice chamber, and out through the double wall of the refrigerating compartment as at 36, the outer end provided with a spigot 37 for establishing communication with the water compartment 27ª. Carried by the upper edges of the ice chamber 29 is a cover 38 forming an air tight chamber.

It can be readily seen that in the use of this device the ice is placed in the chamber 29 upon the coils and drain pan, water placed in the compartment 27ª, and the same will be sufficiently cooled by its circulation through the coils for drinking water and can be drawn from the spigot 37. It can also be stated that each of the sections are independently rotated around the standard 5, and that the drain water from the ice is carried down through the drain pipe and out through the water trap 11, the lower compartments are used for a kitchen cabinet for articles such as sugar, salt, coffee, tea and the like, while the upper compartment is arranged around the ice chamber is for perishable articles, such as butter, eggs, and milk, etc., and it is to be noted that there is sufficient circulation of air from the ice chamber into the compartments to keep them sufficiently cool and at the right temperature, preventing the contents of these compartments from spoiling.

It is to be understood that such minor features of construction, combination, and arrangement of parts may necessitate alteration to which the patentee is entitled such alterations are comprehended within the scope of what is claimed.

What is claimed is:

1. A combined kitchen cabinet and refrigerator comprising a base, means for rotatably supporting the base, a hollow vertical standard removably secured centrally to the base, a cabinet rotatably mounted upon the base and about the standard, means for establishing a communication between the interior of the cabinet and standard, a refrigerator rotatably mounted about the upper portion of the standard and independently rotatable of the cabinet, means establishing a communication between the standard and cabinet.

2. A device of the class described comprising a rotatable base, a vertical standard removably secured by one end to the central portion of the base and extending vertically therefrom, a cabinet rotatably mounted on the upper side of the base and about the standard, an auxiliary support secured adjacent the upper end of the standard, a refrigerator rotatably mounted upon the upper end of the standard and upon the auxiliary support, said refrigerator being independently rotatable of the cabinet, an ice compartment, means for establishing a communication between the standard and the cabinet to facilitate the keeping of the contents of the cabinet in a cooled condition at all times, and means arranged in the ice compartment and extending through and below the lower end of the standard to drain the water therefrom.

3. A combined kitchen cabinet and refrigerator comprising a base, a standard removably secured by one end to the base, a cabinet rotatably mounted on the base and about the standard, a refrigerator rotatably mounted upon the upper end of the standard and independently rotatable of the cabinet, means for preventing lateral shifting movement of the cabinet and refrigerator upon the standard, said means rotatably supporting the cabinet and refrigerator to permit the same to be rotated, and means arranged in the standard for establishing a communication between the standard and cabinet, as and for the purpose specified.

In testimony whereof I affix my signature in presence of two witnesses.

THOMAS J. POLK.

Witnesses:
CLAYTON THIGPEN,
J. W. YOUNG.